(12) United States Patent
Park et al.

(10) Patent No.: US 8,172,319 B2
(45) Date of Patent: May 8, 2012

(54) ACTIVE HEADREST APPARATUS FOR VEHICLE AND ACTUATOR THEREOF

(75) Inventors: Sang Do Park, Ansan-si (KR); Hak Gyun Kim, Hwaseong-si (KR); Dong Woo Jeong, Hwaseong-si (KR); Gil Ju Kim, Hwaseong-si (KR); Bong Ku Kim, Hwaseong-si (KR); Jun Yeol Heo, Suwon-si (KR); Jong Kweon Pyun, Suwon-si (KR); Sang Nam Park, Asan-si (KR); Jong Yun Lee, Seoul (KR); In Ho Lee, Hwaseong-si (KR)

(73) Assignees: Hyundai Motor Company, Seoul (KR); Kia Motors Corp., Seoul (KR); Dymos Inc., Seosan-Si (KR)

( * ) Notice: Subject to any disclaimer, the term of this patent is extended or adjusted under 35 U.S.C. 154(b) by 315 days.

(21) Appl. No.: 12/510,700

(22) Filed: Jul. 28, 2009

(65) Prior Publication Data

US 2010/0127540 A1 May 27, 2010

(30) Foreign Application Priority Data

Nov. 26, 2008 (KR) ........................ 10-2008-0118376

(51) Int. Cl.
*B60N 2/42* (2006.01)
(52) U.S. Cl. .................................. 297/216.12
(58) Field of Classification Search ............... 297/216.12
See application file for complete search history.

(56) References Cited

U.S. PATENT DOCUMENTS

| | | | | |
|---|---|---|---|---|
| 6,352,285 B1 * | 3/2002 | Schulte et al. | ................ | 280/756 |
| 7,134,717 B2 * | 11/2006 | Thunnissen et al. | ...... | 297/216.12 |
| 7,234,769 B2 * | 6/2007 | Takenaka et al. | ........ | 297/216.12 |
| 7,284,794 B2 * | 10/2007 | Yamaguchi et al. | ...... | 297/216.12 |
| 7,523,987 B2 * | 4/2009 | Yamaguchi | .............. | 297/216.12 |
| 7,673,938 B2 * | 3/2010 | Yamaguchi et al. | ...... | 297/216.12 |
| 7,845,721 B2 * | 12/2010 | Maeda et al. | ............ | 297/216.12 |
| 2008/0061608 A1 * | 3/2008 | Yamaguchi | .............. | 297/216.12 |
| 2009/0322127 A1 * | 12/2009 | Michalak et al. | ........ | 297/216.12 |

FOREIGN PATENT DOCUMENTS

| | | |
|---|---|---|
| JP | 2006-151035 A | 6/2006 |
| JP | 2008-201234 A | 9/2008 |
| KR | 10-2007-0102365 A | 10/2007 |

* cited by examiner

*Primary Examiner* — Peter R. Brown
(74) *Attorney, Agent, or Firm* — Morgan, Lewis & Bockius LLP

(57) ABSTRACT

An actuator of an active headrest apparatus for a vehicle, which is operably connected to a headrest assembly and selectively allows a headrest of the headrest assembly to pop out forwards when a vehicle collision occurs, may include a housing installed on a seatback frame and formed with a guide groove, an operating plate elastically supported over the housing, an operating bracket arranged between the housing and the operating plate and having a guide projection slidably inserted into the guide groove of the housing, and an operating wire unit connecting the operating bracket with the headrest assembly, wherein the operating wire unit includes an operating wire and an operating wire retainer to slidably receive the operating wire therein.

8 Claims, 5 Drawing Sheets

_US 8,172,319 B2_

ACTIVE HEADREST APPARATUS FOR VEHICLE AND ACTUATOR THEREOF

CROSS-REFERENCE TO RELATED APPLICATION

The present application claims priority to Korean Application No. 10-2008-0118376 filed on Nov. 26, 2008, the entire contents of which application is incorporated herein for all purposes by this reference.

BACKGROUND OF THE INVENTION

1. Field of the Invention

The present invention relates to an active headrest apparatus for a vehicle and an actuator thereof 2. Description of Related Art A vehicle headrest is installed on the top of the back of a vehicle seat to support the head and neck of an occupant. The vehicle headrest prevents the head and neck of the occupant from being injured by the backlash of the body during a collision and ensures a comfortable ride by supporting the head and neck of an occupant under normal driving conditions.

As shown in FIG. 6, the active headrest apparatus of the prior art includes a seat frame 20, a rotational shaft 40 rotatably installed inside the seat frame 20, a shock suspension 50 connected to the rotational shaft 40 and rotatably installed around the rotational shaft 40 inside the seat frame 20, a headrest 10 located on the top of the seat frame 20, and connecting rods 30 extending through guide holes formed in the top portion of the seat frame 20 to link the shock suspension 50 with the headrest 10.

In the conventional active headrest apparatus, the headrest is moved up and forward at the same time by a crash test dummy during a rear-end collision and then moves back to the initial position without maintaining the position moved to when the dummy moved forwards. On the other hand, the upper body of the occupant is instantaneously pushed forward by a seatback and the neck of the occupant performs a relative motion with respect to the upper body because of the inertial force. Like this, the relative motion of the neck may apply considerable pressure to the neck joint and the soft tissues around the neck.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an active headrest apparatus for a vehicle and an actuator thereof, wherein an operational reaction in accordance with a vehicle collision happens immediately, a foreign body feeling because of the shock suspension can be removed, and a seated occupant's head and neck are effectively protected from being injured due to a car collision.

The actuator of an active headrest apparatus for a vehicle, which is operably connected to a headrest assembly and selectively allows a headrest of the headrest assembly to pop out forwards when a vehicle collision occurs, may include a housing installed on a seatback frame and formed with a guide groove, an operating plate elastically supported over the housing, an operating bracket arranged between the housing and the operating plate and having a guide projection slidably inserted into the guide groove of the housing, and an operating wire unit connecting the operating bracket with the headrest assembly, wherein the operating wire unit includes an operating wire and an operating wire retainer to sidably receive the operating wire therein.

The operating bracket may include a first operating bracket, to which one end portion of the operating wire is fixed, and a second operating bracket, to which one end portion of the operating wire retainer is fixed so as to move the first and second operating brackets in opposite directions each other while the first and second operating brackets are pressed or released by the operating plate, wherein the guide groove includes a pair of guide grooves formed in either end portion of the housing, to receive guide projections of the first and second operating brackets respectively, wherein each pair of the guide grooves formed in one end portion of the housing is formed to extend outwards with a downward inclination in an opposite direction with each pair of the guide grooves formed in the other end portion of the housing with respect to a movement direction of operating plate, and wherein the first and second operating brackets have incline planes respectively and contact with a lower portion of the operating plate, the lower portion of the operating plate having corresponding inclinations to the incline planes of the first and second operating brackets.

The incline planes of the first and second operating brackets may be formed in an opposite direction each other with respect to a movement direction of the operating plate.

In another aspect of the present invention, the operating plate has an operating projection extending downwards, and the housing has an insertion groove to receive the operating projection therein and to elastically support the operating projection via an elastic spring disposed in the insertion groove.

The headrest assembly may include a headrest drive module, and a latch module which is connected with the operating wire so as to lock/unlock the headrest to/from the seatback frame, the latch module unlocking the headrest when the operating wire is pulled up and the unlocked headrest popping up forwards by the headrest drive module when the vehicle collision occurs, wherein the headrest drive module includes a main bar fixed to the seatback frame, a sliding cap slidingly coupled to the main bar, and a sliding bar pivotally coupling the sliding cap and the headrest, wherein the sliding cap is elastically compressed in a normal stat and wherein the latch module may include a latch lever pivotally coupled to the seatback frame, one end of which is connected to the other end of the operating wire, a release lever pivotally coupled to the headrest, one end of which is selectively engaged with the latch lever and the other end of which is selectively engaged with a lock bar fixed to the headrest.

According to various aspects of the present invention, the actuator for allowing the headrest to pop out forward when a vehicle collision occurs is installed in the lower portion of the seatback frame. This is advantageous since the actuator having this construction can more rapidly perform the operating reaction than the actuator installed in the upper portion of the seatback frame can.

The present invention is also advantageous in terms of improved product control as well as reduced cost and weight due to having a reduced number of product parts. Here, a series of operations of popping out the headrest to the front can be realized by a simple construction of the actuator wherein the operating wire is pulled up when a car collision occurs.

In addition, since the operating force of the actuator in accordance with the present invention can be easily adjusted by controlling the tilted angle of the guide groove, the wire length, or the spring force, the actuator can be variously applied depending on the type of vehicle and the operating environment of the vehicle.

Furthermore, since the conventional shock suspension installed in the middle portion of the seatback is not required in the present invention, it is also advantageous in that a foreign body feeling due to the shock suspension can be removed and the surplus space of the middle portion of the seatback can be utilized.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
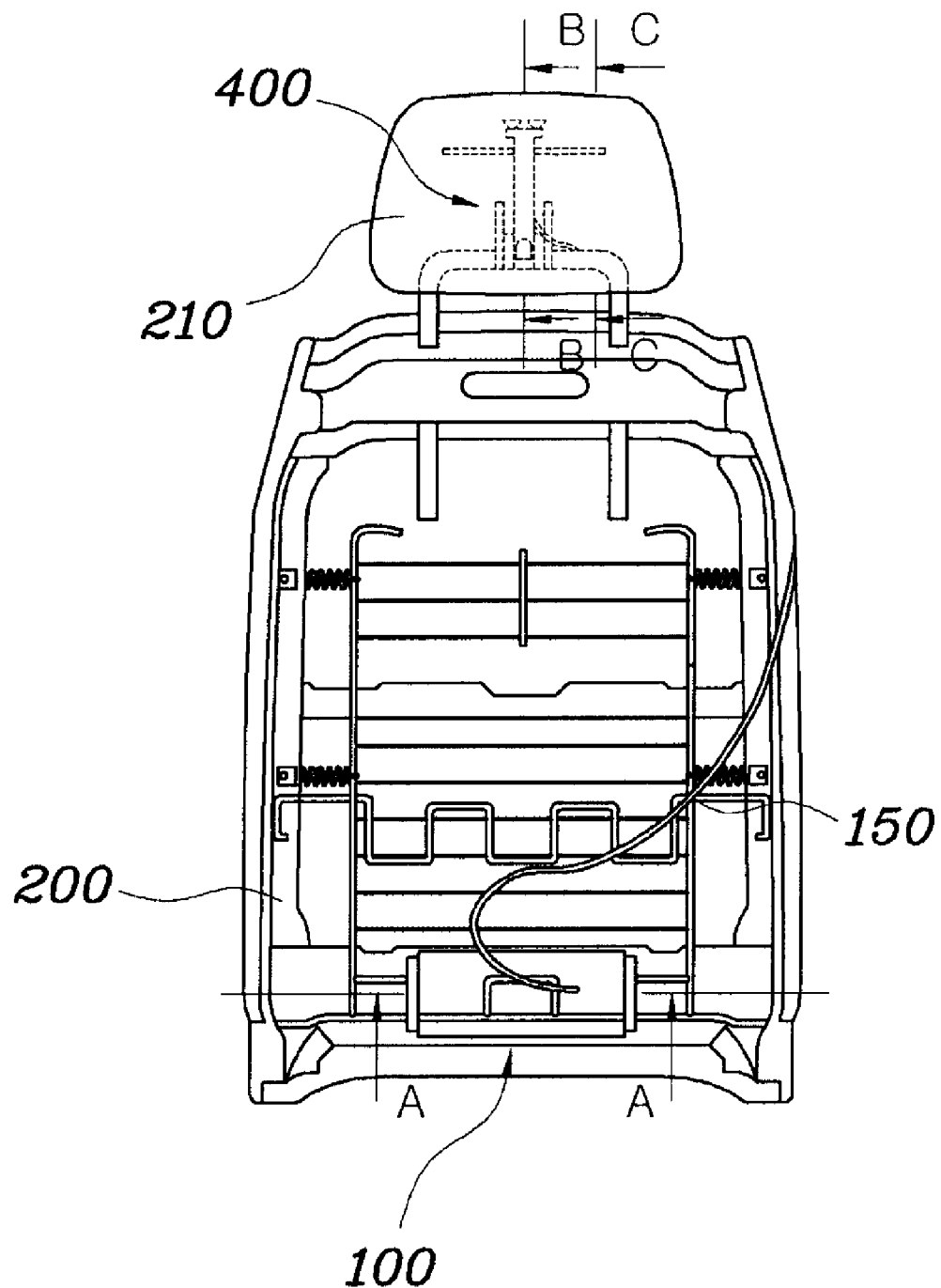
FIG. 1 is a configuration view illustrating an exemplary active headrest apparatus for a vehicle in accordance with the present invention.
Figure 2:
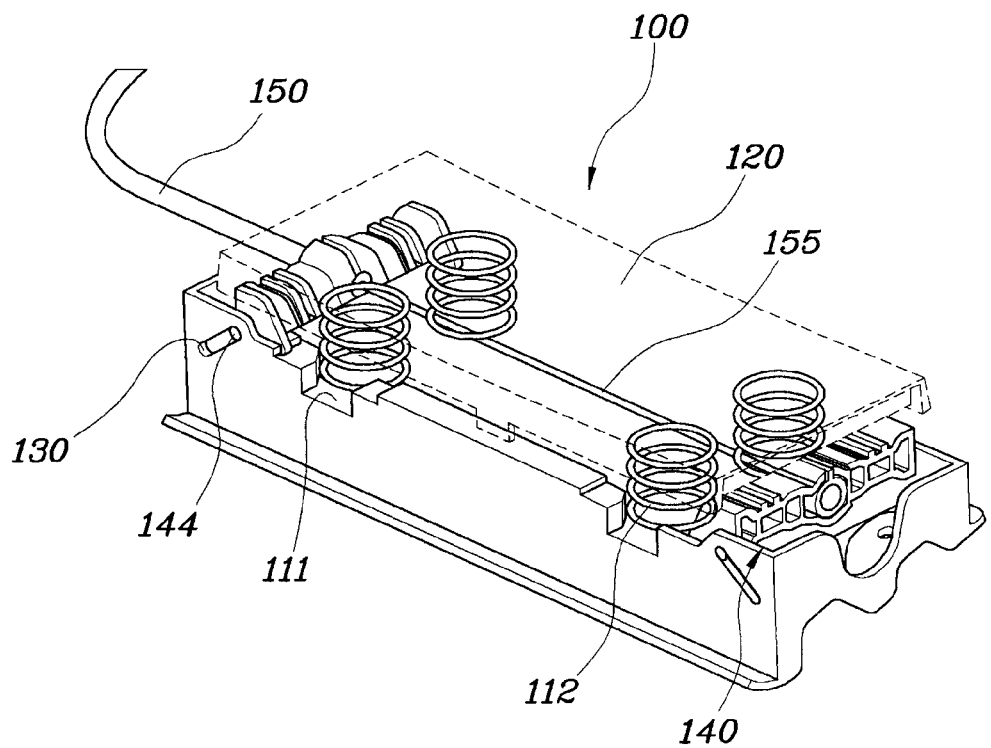
FIG. 2 is a perspective view illustrating an exemplary actuator of the active headrest apparatus for a vehicle in accordance with the present invention.
Figure 3:
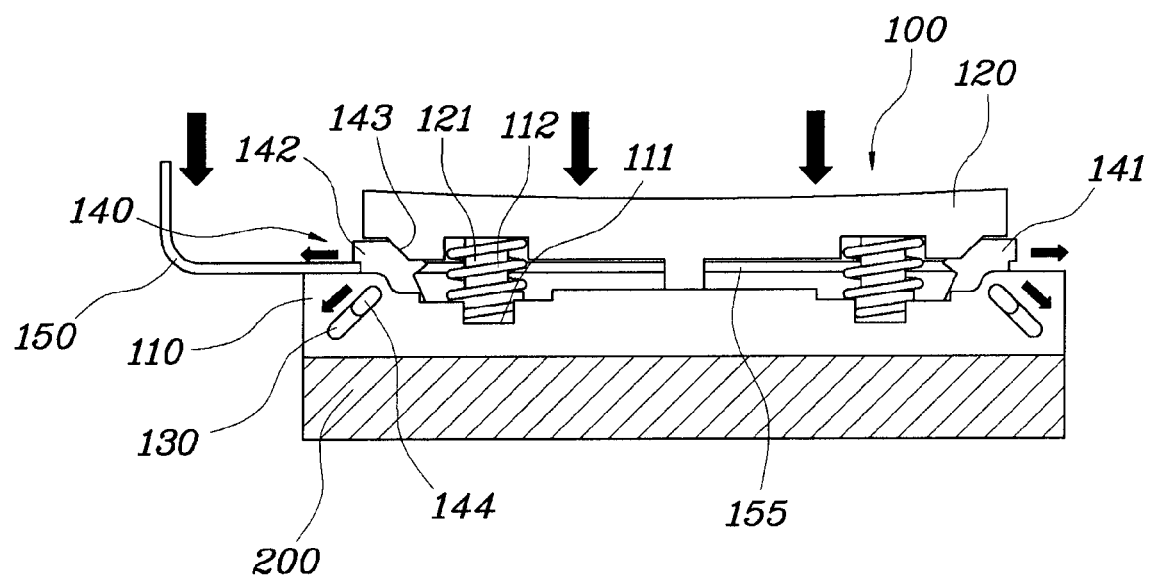
FIG. 3 is a cross-sectional view taken along line "A-A" of FIG. 1.

As shown in FIGS. 1 to 3, an active headrest apparatus for a vehicle of various embodiments of the present invention is characterized by a simple configuration, in which an actuator 100 is installed in the lower portion of the seatback frame 200, with an operating wire 155 of the actuator being pulled up by an operating bracket 140, which slides in vehicle collision. With this configuration, product control is improved and immediate operating reaction can be realized.

The active headrest apparatus includes a headrest assembly, which allows a headrest to pop out forward when a car collision occurs, and the actuator 100. Here, the headrest assembly includes a headrest drive module for driving the headrest 210 forward and a latch module 400 selectively locking or releasing the headrest drive module.

In more detail, the actuator 100 installed in the lower portion of the seatback frame 200 plays a role of releasing the locking of the headrest drive module when a car collision occurs.

To realize this function, the actuator 100 includes a housing 110, an operating plate 120 elastically supported on the housing 110, an operating bracket 140 arranged under the operating plate 120, and the operating wire retainer 150 and the operating wire 155 connected with the operating bracket 140 to transfer push movement from the operating plate 120 to the latch module 400.

The housing 110 is a supporting case enclosing the aforementioned parts and is fixedly installed in the lower portion of the seatback frame 200. Like this, since the buttocks react faster than the shoulders of an occupant can react to a car collision, the actuator 100 located in the lower portion of the seatback frame 200 can react faster than that located in the top portion of the seatback frame 200. Accordingly, the actuator 100 can immediately react to the car collision.

The housing 110 elastically supports the operating plate 120 via a plurality of elastic springs 112. Here, a plurality of the elastic springs 112 can be evenly arranged under the operating plate 120 to support the operating plate 120 and balance it. In various embodiments of the present invention, the elastic springs 112 are composed of four elastic springs 112 supporting either corner of the operating plate 120.

Insertion grooves 111 formed in the housing 110 elastically support operating projections 121 of the operating plate 120 via the elastic springs 112. Each of the insertion grooves 111 guides the movement of a corresponding one of the operating projections 121 when the operating plate 120 is pressed by a backward sliding of the occupant.

Guide grooves 130 guiding the sliding movement of the operating bracket 140 are respectively formed in both ends of the housing 110. The guide grooves 130 function to guide the movement of the operating bracket 140, which will be described later, and extend outwards with a downward inclination from the top central portion the housing 110.

The operating plate 120 is installed on the top of the housing 110, with the elastic springs 112 interposed therebetween, and is structured to be pressed by the upper buttocks of the occupant when a car collision occurs. A plurality of the operating projections 121 extending downwards from the operating plate 120 are fitted into the insertion grooves 111 of the housing 110. Each of the elastic springs 112 is interposed between each of the operating projections 121 and a corresponding one of the insertion grooves 111.

Under the operating plate 120, the operating bracket 140 is installed to convert the downward motion into the lateral movement. The operating bracket 140 is in contact with the lower portion of the operating plate 120 via incline planes 143, and is guided to the guide grooves 130 of the housing 110 via the projections 144. When the operating plate 120 moves downwards, the downward motion of the operating plate 120 can be converted into the lateral movement by the operating bracket 140 moving along the slope of the guide grooves 130 of the housing 110.

The operating bracket 140 includes a first operating bracket 141 and a second operating bracket 142 arranged on both ends thereof. The first operating bracket 141 is fixed with one end of the operating wire 155, and the second operating bracket 142 is connected to the operating wire retainer 150 and guides the passing-through of the operating wire 155. When the first operating bracket 141 and the second operating bracket 142 become wider towards both ends of the operating plate 120 by the downward movement of the operating plate 120, the operating wire 155 can be pulled up by the first operating bracket 141.

The operating wire 155 connects the operating bracket with the headrest drive module through the operating wire retainer 150. In particular, the headrest 210 can pop out forward via the headrest drive module when the operating wire 155 is pulled up.

The headrest drive module provides the operating force to move the headrest 210 forward. While the headrest drive module is normally held in the locked status via the latch module 400, the latch module 400 is unlocked by the operation of the operating wire 155 and the operating wire retainer 150 when a car collision occurs. As a result, the headrest drive module drives the headrest 210 to pop up forward, thereby protecting the occupant's neck when the car collision happens.

Figure 4:
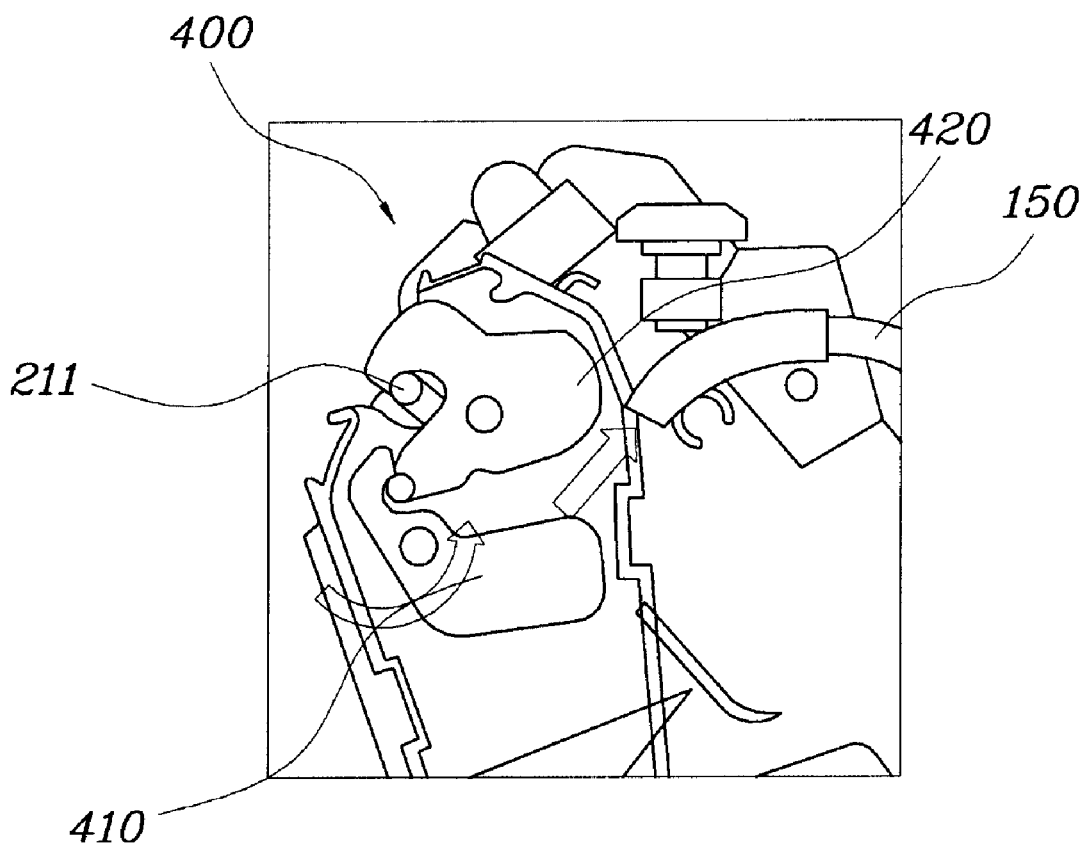
FIG. 4 is a configuration view taken along line "B-B" of FIG. 1, showing an exemplary latch module of the active headrest apparatus of the present invention.

As shown in FIG. 4, the latch module 400 includes a release lever 420 fixing a lock bar 211 of the headrest drive module and a latch lever 410 linking to the operating wire 155 while binding the release lever 420.

When the latch lever 410 is pulled by the operating wire 155, it rotates counterclockwise from the view of FIG. 4 while turning the release lever 420 clockwise from the view of FIG. 4 so that the lock bar 211 rotates in the bound position.

The latch lever 410 is provided with a returning spring. When the pushing pressure of the operating plate 120 is removed, the returning spring can push out the operating wire 140 while returning to the original position. At this time, the operating wire 155 can return to the original position and the operating bracket 140 connected to the operating wire retainer 150 and the operating wire 155 can return to the original position as well by the return spring.

Figure 5A:
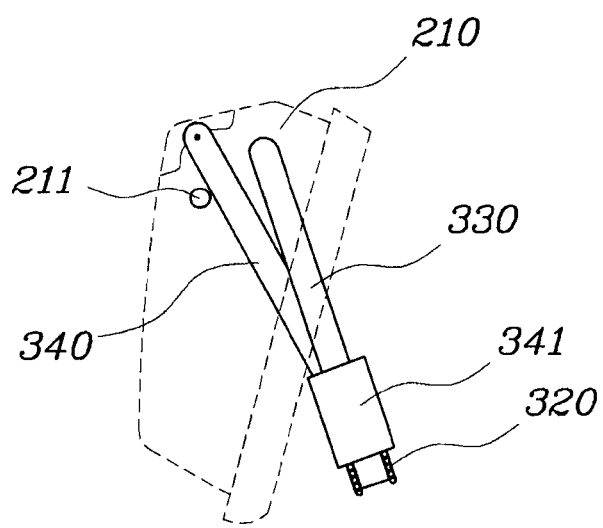
FIG. 5A is a lateral sectional view taken along line "C-C" of FIG. 1, showing an exemplary headrest drive module of the active headrest apparatus of the present invention prior to operation.

As shown in FIG. 5A, the headrest drive module includes the lock bar 211 fixedly installed on the headrest 210 and normally bound by the release lever 420 of the latch module 400 wherein the release lever 420 is rotatably fixed to the seatback, a main bar 330 fixedly installed on the seatback, a sliding cap 341 movably installed in the longitudinal direction along the main bar 330, a compressed spring 320 installed inside the sliding cap 341 so as to maintain the compressed status in normal times, and a sliding bar 340 having one end connected to the sliding cap 341 and extending forward with an inclination and the other end fixed on the headrest 210.

Figure 5B:
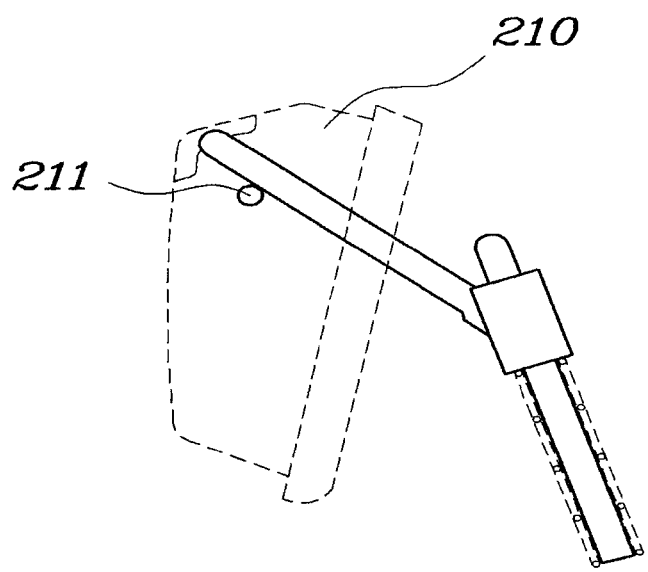
FIG. 5B is a lateral sectional view taken along line "C-C" of FIG. 1, showing the headrest drive module of the present invention after operation.
Figure 6:
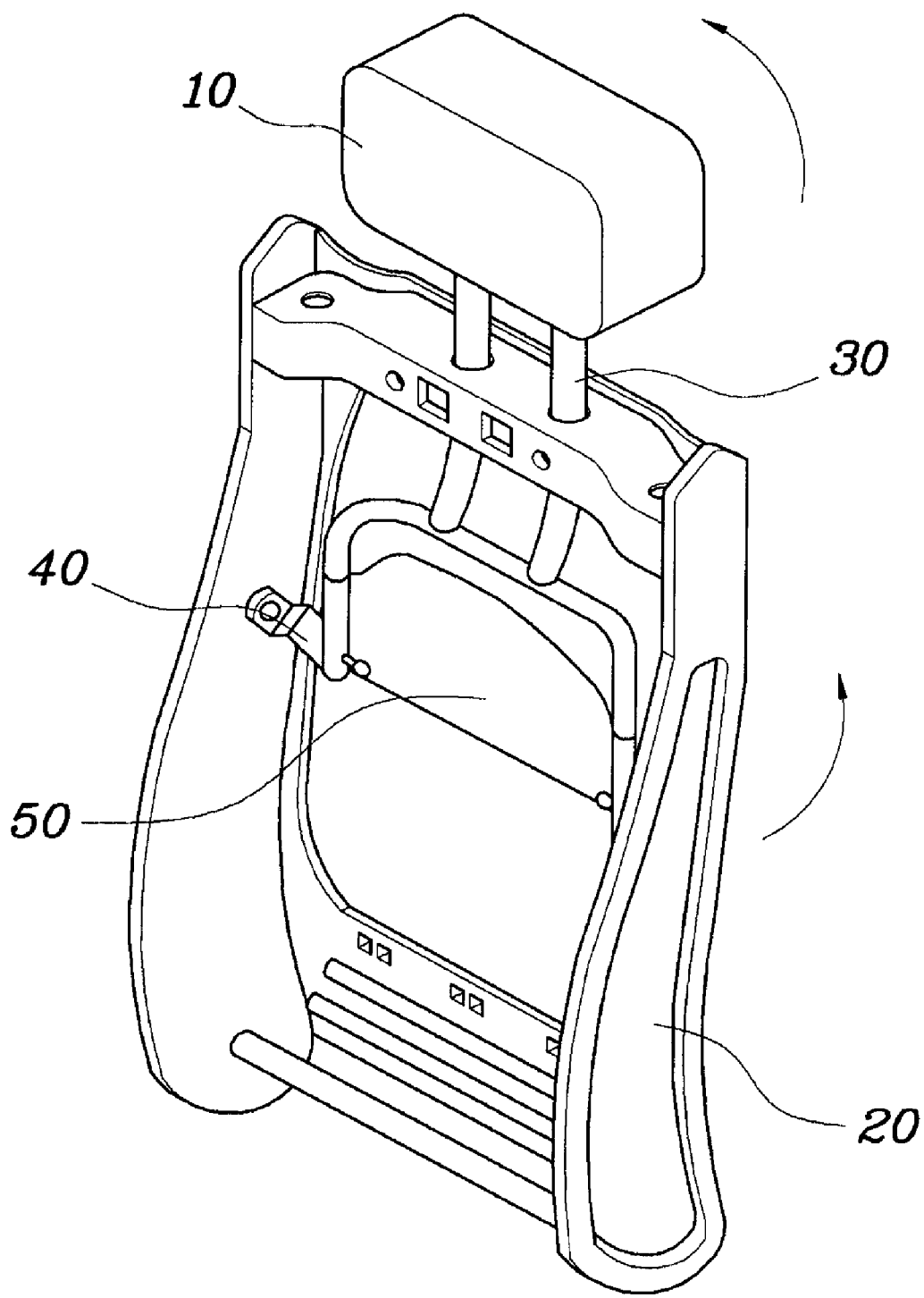
FIG. 6 is a configuration view illustrating a conventional active headrest apparatus for a vehicle.

When the lock bar 211 for the release lever 420 is unlocked, as shown in FIG. 5B, the sliding cap 341 as well as the sliding bar 340 moves up along the main bar 330 while the condensed compressed spring 320 is stretching. At this time, the headrest 210 can pop out forward while the end of the sliding bar 340 is also moving up. Consequently, the neck of the seated occupant can be protected via the headrest 210 that is popped out forward.

Although various embodiments has been described with reference to the construction in which the headrest 210 is popped out forward by the unlocking of the headrest drive module via the pulling motion of the operating wire 155, this is not intended to limit an exemplary embodiment of the present invention. Rather, various embodiments of the present invention may embrace all the constructions, in which the headrest 210 is popped out when the operating wire 155 of the actuator 100 is pulled up during a vehicle collision.

For convenience in explanation and accurate definition in the appended claims, the terms "upper", "lower", and "forwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuator of an active headrest apparatus for a vehicle, which is operably connected to a headrest assembly and selectively allows a headrest of the headrest assembly to pop out forwards when a vehicle collision occurs, the actuator comprising:
   a housing installed on a seatback frame and formed with a guide groove;
   an operating plate elastically supported over the housing, wherein upon the vehicle collision, a force from a seat occupant bears against the operating plate;
   an operating bracket arranged between the housing and the operating plate and having a guide projection slidably inserted into the guide groove of the housing; and
   an operating wire unit connecting the operating bracket with the headrest assembly, wherein the operating wire unit includes an operating wire and an operating wire retainer to slidably receive the operating wire therein;
   wherein the operating bracket includes:
      a first operating bracket, to which one end portion of the operating wire is fixed; and
      a second operating bracket, to which one end portion of the operating wire retainer is fixed so as to move the first and second operating brackets in opposite directions each other while the first and second operating brackets are pressed or released by the operating plate;
   wherein the guide groove comprises a pair of guide grooves formed in either end portion of the housing, to receive guide projections of the first and second operating brackets respectively, and
   wherein each pair of the guide grooves formed in one end portion of the housing is formed to extend outwards with a downward inclination in an opposite direction with each pair of the guide grooves formed in the other end portion of the housing with respect to a movement direction of operating plate.

2. The actuator of an active headrest apparatus for a vehicle in accordance with claim 1, wherein the first and second operating brackets have incline planes respectively and contact with a lower portion of the operating plate, the lower portion of the operating plate having corresponding inclinations to the incline planes of the first and second operating brackets.

3. The actuator of an active headrest apparatus for a vehicle in accordance with claim 2, wherein the incline planes of the first and second operating brackets are formed in an opposite direction each other with respect to a movement direction of the operating plate.

4. The actuator of an active headrest apparatus for a vehicle in accordance with claim 1, wherein
   the operating plate has an operating projection extending downwards, and
   the housing has an insertion groove to receive the operating projection therein and to elastically support the operating projection via an elastic spring disposed in the insertion groove.

5. The actuator of an active headrest apparatus for a vehicle in accordance with claim 1, wherein the headrest assembly includes:
   a headrest drive module; and
   a latch module which is connected with the operating wire so as to lock/unlock the headrest to/from the seatback frame, the latch module unlocking the headrest when the operating wire is pulled up and the unlocked headrest popping up forwards by the headrest drive module when the vehicle collision occurs.

6. The actuator of an active headrest apparatus for a vehicle in accordance with claim 5, wherein the headrest drive module includes:
   a main bar fixed to the seatback frame;
   a sliding cap slidingly coupled to the main bar; and
   a sliding bar pivotally coupling the sliding cap and the headrest,
   wherein the sliding cap is elastically compressed in a normal state.

7. The actuator of an active headrest apparatus for a vehicle in accordance with claim 5, the latch module includes:
   a latch lever pivotally coupled to the seatback frame, one end of which is connected to the other end of the operating wire, the latch lever being rotationally biased by an elastic member;
   a release lever pivotally coupled to the headrest, one end of which is selectively engaged with the latch lever and the other end of which is selectively engaged with a lock bar fixed to the headrest.

8. An active headrest apparatus for a vehicle, comprising:
   a headrest drive module providing an operating force to a headrest to move the headrest forwards;
   a latch module selectively locking or unlocking the headrest to/from a seatback frame; and
   an actuator including:
   a housing installed on the seatback frame and formed with a guide groove;
   an operating plate elastically supported over the housing wherein upon the vehicle collision, a force from a seat occupant bears against the operating plate;
   an operating bracket arranged between the housing and the operating plate and having a guide projection slidably inserted into the guide groove of the housing; and
   an operating wire unit operably connecting the operating bracket with the latch module, wherein the operating wire unit includes an operating wire and an operating wire retainer to slidably receive the operating wire therein,
   wherein the operating bracket includes:
     a first operating bracket, to which one end portion of the operating wire is fixed; and
     a second operating bracket, to which one end portion of the operating wire retainer is fixed so as to move the first and second operating brackets in opposite directions each other while the first and second operating brackets are pressed or released by the operating plate;
   wherein the latch module unlocks the headrest from the seatback frame when the operating wire is pulled up;
   wherein the latch module includes:
     a latch lever pivotally coupled to the seatback frame, one end of which is connected to the other end of the operating wire, the latch lever being rotationally biased by an elastic member;
     a release lever pivotally coupled to the headrest, one end of which is selectively engaged with the latch lever and the other end of which is selectively engaged with a lock bar fixed to the headrest; and
   wherein the headrest drive module includes:
     a main bar fixed to the seatback frame;
     a sliding cap slidingly coupled to the main bar; and
     a sliding bar pivotally coupling the sliding cap and the headrest,
     wherein the sliding cap is elastically compressed in a normal state.

* * * * *